United States Patent
LiPiShan et al.

(10) Patent No.: US 9,422,383 B2
(45) Date of Patent: Aug. 23, 2016

(54) ETHYLENE/ALPHA-OLEFIN/NONCONJUGATED POLYENE INTERPOLYMERS AND PROCESSES TO FORM THE SAME

(71) Applicant: Dow Global Technologies LLC, Midland, MI (US)

(72) Inventors: Colin LiPiShan, Pearland, TX (US); Thomas W. Karjala, Lake Jackson, TX (US); Michael L. Smith, Lake Jackson, TX (US); Liam P. Spencer, Manvel, TX (US); Jerzy Klosin, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 24 days.

(21) Appl. No.: 14/367,478

(22) PCT Filed: Dec. 20, 2012

(86) PCT No.: PCT/US2012/070859
§ 371 (c)(1),
(2) Date: Jun. 20, 2014

(87) PCT Pub. No.: WO2013/096573
PCT Pub. Date: Jun. 27, 2013

(65) Prior Publication Data
US 2015/0322185 A1 Nov. 12, 2015

Related U.S. Application Data

(60) Provisional application No. 61/577,720, filed on Dec. 20, 2011, provisional application No. 61/731,891, filed on Nov. 30, 2012.

(51) Int. Cl.
*C08F 4/76* (2006.01)
*C08F 210/18* (2006.01)
*C08F 4/659* (2006.01)

(52) U.S. Cl.
CPC ........... *C08F 210/18* (2013.01); *C08F 4/65908* (2013.01); *C08F 4/65912* (2013.01)

(58) Field of Classification Search
CPC . C08F 4/60193; C08F 4/64193; C08F 210/18
See application file for complete search history.

(56) References Cited

U.S. PATENT DOCUMENTS

| | | | |
|---|---|---|---|
| 6,680,361 B1 * | 1/2004 | Cady | C08F 10/00 502/152 |
| 8,058,373 B2 | 11/2011 | Stevens et al. | |
| 8,202,953 B2 * | 6/2012 | Konze | C08F 10/00 526/160 |
| 8,299,189 B2 * | 10/2012 | Boone | C08F 10/00 526/160 |
| 8,349,984 B2 | 1/2013 | Konze et al. | |
| 8,354,484 B2 | 1/2013 | Konze et al. | |
| 8,420,760 B2 | 4/2013 | Hughes et al. | |
| 8,450,438 B2 | 5/2013 | Aboelella et al. | |
| 8,772,414 B2 * | 7/2014 | Liang | C08J 3/24 525/331.8 |
| 2008/0051537 A1 | 2/2008 | Carnahan et al. | |
| 2012/0116021 A1 | 5/2012 | Liang et al. | |
| 2012/0129417 A1 | 5/2012 | Taha et al. | |
| 2014/0343213 A1 * | 11/2014 | Walther | C08F 10/18 524/445 |

FOREIGN PATENT DOCUMENTS

| | | | |
|---|---|---|---|
| WO | WO 2007/136494 A2 * | 11/2007 | C08F 2/04 |
| WO | 2013/096573 A1 | 6/2013 | |

OTHER PUBLICATIONS

PCT/US2012/070859 International Search Report and Written Opinion, mailed Mar. 14, 2013.
PCT/US2012/070859 International Preliminary Report on Patentability, mailed Jul. 3, 2014.

\* cited by examiner

*Primary Examiner* — Rip A Lee

(57) ABSTRACT

The invention provides a solution polymerization process to form an ethylene/α-olefin/nonconjugated polyene interpolymer, said process comprising polymerizing ethylene, an α-olefin, and a nonconjugated polyene in at least one reactor in the presence of a catalyst selected from Formula I, as described herein; and wherein the polymerization is conducted in a continuous process; and wherein the interpolymer has a rheology ratio (V0.1/V100 at 19° C.) greater than, or equal to, 20.

11 Claims, 1 Drawing Sheet

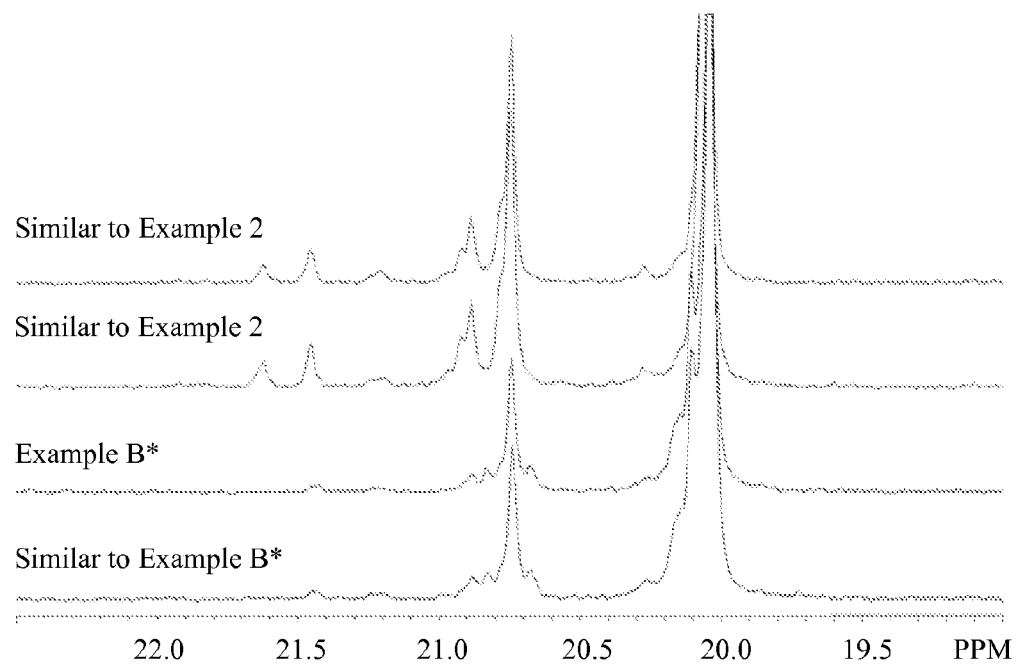

ETHYLENE/ALPHA-OLEFIN/NONCONJUGATED POLYENE INTERPOLYMERS AND PROCESSES TO FORM THE SAME

REFERENCE TO RELATED APPLICATIONS

The present application claims the benefit of U.S. Provisional Application No. 61/577,720, filed Dec. 20, 2011, and the benefit of U.S. Provisional Application No. 61/731,891, filed Nov. 30, 2012.

BACKGROUND OF THE INVENTION

There is a need for new ethylene/alpha-olefin/nonconjugated polyene interpolymers with improved processability, melt strength, and physical properties in rubber compounds, and for new polymerization processes to form the same at higher temperatures, to save on production energy costs and to increase throughput.

International Publication WO2011/002998 discloses ethylenic polymers comprising low levels of total unsaturation. Compositions using such ethylene polymers, and fabricated articles made from them, are also disclosed.

International Publication WO2007/136497 discloses a catalyst composition comprising one or more metal complexes of a multifunctional Lewis base ligand, comprising a bulky, planar, aromatic- or substituted aromatic-group, and polymerization processes employing the same, and especially continuous, solution polymerization of one or more $\alpha$-olefins at high catalyst efficiencies.

International Publication WO2007/136494 discloses a catalyst composition comprising a zirconium complex of a polyvalent aryloxyether, and the use thereof in a continuous solution polymerization of ethylene, one or more $C_{3-30}$ olefins, and a conjugated or nonconjugated diene to prepare interpolymers having improved processing properties are disclosed.

International Publication WO2007/136496 discloses metal complexes of polyvalent aryloxyethers, appropriately substituted with sterically bulky substituents, that possess enhanced solubility in aliphatic and cycloaliphatic hydrocarbons, and/or when employed as catalyst components for the polymerization of ethylene/$\alpha$-olefin copolymers, produce products having reduced $I_{10}/I_2$ values.

International Publication WO2011/002986 discloses ethylene polymers having low levels of long chain branching. Films and film layers made from these polymers have good hot tack strength over a wide range of temperatures, making them good materials for packaging applications.

International Publication WO2009/067337 discloses substantially isotactic propylene interpolymers comprising the following: (A) at least 60 weight percent (wt %) units derived from propylene, and (B) between greater than zero and 40 wt % units derived from ethylene. The propylene interpolymer is further characterized by at least one of the following properties: (1) a g' ratio of less than 1, measured at interpolymer number average molecular weight (Mn), (2) a relative compositional drift of less than 50%, and (3) propylene chain segments having a chain isotacticity triad index of at least 70 mole percent.

International Publication WO2006/020624 discloses a supported, heterogeneous catalyst composition for use in polymerization of addition polymerizable monomers, to form high molecular weight polymers, comprising the following: 1) a substrate comprising a solid, particulated, high surface area, surface modified, inorganic oxide compound, 2) a Group 4 metal complex of a bis(hydroxyarylaryloxy) ligand; and optionally 3) an activating cocatalyst for the metal complex.

International Publication WO2007/136493 discloses a process for polymerization of propylene, optionally ethylene, and further, optionally, one or more $C_{4-30}$ $\alpha$-olefins and/or one or more conjugated or nonconjugated dienes, under continuous, solution polymerization conditions, to prepare a high molecular weight polymer or interpolymer. The process comprising conducting the polymerization in the presence of a catalyst composition comprising a hafnium complex of a polyvalent aryloxyether.

International Publication WO2007/136495 discloses a catalyst composition comprising a zirconium complex of a polyvalent aryloxyether, and an alumoxane, and a polymerization processes employing the same, and especially the continuous, solution polymerization of ethylene and one or more $C_{3-30}$ olefins or diolefins to prepare copolymers having reduced cocatalyst by-product content.

International Publication WO2007/136506 discloses a catalyst composition comprising a zirconium complex of a polyvalent aryloxyether, and a polymerization process employing the same, and especially a continuous, solution polymerization of ethylene and one or more $C_{3-30}$ olefins or diolefins to prepare interpolymers having improved processing properties.

International Publication WO/2011/008837 discloses a composition comprising a first composition, which first composition comprises the following: A) a first interpolymer comprising, in polymerized form, ethylene, an $\alpha$-olefin and a nonconjugated polyene; B) a second interpolymer comprising, in polymerized form, ethylene, an $\alpha$-olefin and a nonconjugated polyene. The first composition has an [(ML(1+4, 125° C.))/Mw(conv)]*1000 greater than 0.429 mole/g. The invention also provides a composition comprising a first composition, which first composition comprises the following: A) a first interpolymer comprising, in polymerized form, ethylene, an $\alpha$-olefin and a nonconjugated polyene; B) a second interpolymer comprising, in polymerized form, ethylene, an $\alpha$-olefin and a nonconjugated polyene; and wherein the first composition has a Mooney Viscosity (ML, 1+4, 125° C.) greater than, or equal to, 70, and has a low shear viscosity ($\eta$ at 0.1 rad/sec) less than, or equal to, 100,000 Pa·sec. The invention also provides a composition comprising a first composition, which first composition comprises the following: A) a first interpolymer comprising, in polymerized form, ethylene, an $\alpha$-olefin and a nonconjugated polyene; B) a second interpolymer comprising, in polymerized form, ethylene, an $\alpha$-olefin, and a nonconjugated polyene; and wherein the first composition has a Mooney Viscosity (ML(1+4, 125° C.)) greater than, or equal to, 70, and has an [Mw(abs)]/[Mw(conv)] less than 1.2.

International Publication WO/2010/033601 discloses a composition comprising an ethylene/$\alpha$-olefin/non-conjugated diene interpolymer, which has the following properties: an $M_z(abs)/M_z(Conv)$ value greater than 1.35; an $M_z(BB)/M_w(abs)$ value greater than 1.6; and a non-conjugated diene content less than 10 weight percent, based on the total weight of the interpolymer. The invention also provides a process for forming a crosslinked composition, said process comprising: (a) forming a polymeric admixture comprising at least the following: (A) an ethylene/$\alpha$-olefin/non-conjugated diene copolymer, which has the following properties: an $M_z(abs)/M_z(Conv)$ value less than 1.3; an $M_z(BB)/M_w(abs)$ value greater than 1.6, but less than 2.5; and an $M_w(abs)$ value less than 350,000 g/mole; and (B) a coupling amount of (i) at least one poly(sulfonyl azide) or (ii) at least one peroxide; and (b)

heating the resulting admixture to a temperature at least the decomposition temperature of the crosslinking agent.

However, as discussed above, there remains a need for new ethylene/alpha-olefin/nonconjugated polyene interpolymers with improved properties, and for new polymerization processes to form the same. There is a further need for such processes can operate at higher temperatures, enabling higher molecular weight polymers to be produced at lower, in-reactor viscosities. These needs have been met by the following invention.

SUMMARY OF THE INVENTION

The invention provides a solution polymerization process to form an ethylene/α-olefin/nonconjugated polyene interpolymer, said process comprising polymerizing ethylene, an α-olefin, and a nonconjugated polyene in at least one reactor in the presence of a metal ligand complex selected from Formula I:

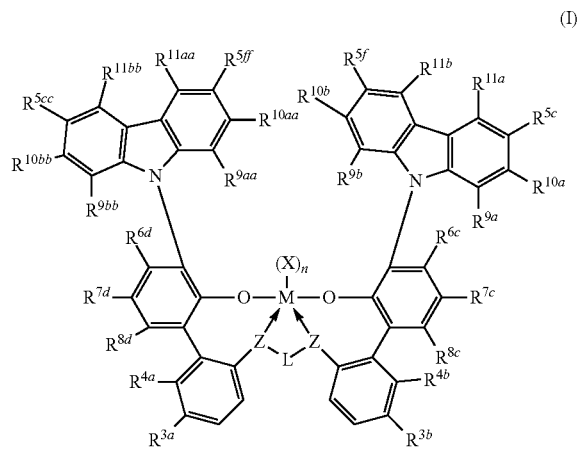

(I)

wherein:

M is a metal of any one of Groups 3 to 6 of the Periodic Table of the Elements (e.g., Group 4), the metal M being in a formal oxidation state of +2, +3, +4, +5, or +6; n is an integer of from 0 to 5, wherein when n is 0, X is absent (i.e., (X)n is absent);

each X, independently, is a monodentate ligand that is neutral, monoanionic, dianionic, trianionic, or tetraionic; or two X are taken together to form a bidentate ligand that is neutral, monoanionic, or dianionic; X and n are chosen in such a way that the metal-ligand complex of formula (I) is, overall, neutral;

each Z, independently, is O, S, N(C1-C40)hydrocarbyl, or P(C1-C40)hydrocarbyl;

L is (C1-C40)hydrocarbylene or (C1-C40)heterohydrocarbylene, wherein the (C1-C40)hydrocarbylene has a portion that comprises a 1-carbon atom to 18-carbon atom linker backbone, preferably a 1-carbon atom to 12 carbon atom linker, linking the Z atoms in formula (I) (to which Z atoms L is bonded) and the (C1-C40)heterohydrocarbylene has a portion that comprises a 1-atom to 18-atom linker backbone, preferably a 1-carbon atom to 12 carbon atom linker, linking the Z atoms in formula (I), wherein each of the from 1 to 18 atoms of the 1-atom to 18-atom linker backbone of the (C1-C40)heterohydrocarbylene independently is a carbon atom or heteroatom, wherein each heteroatom independently is O, S, S(O), S(O)$_2$, Si($^R$C)$_2$, P($^R$P), or N($^R$N), wherein independently each $^R$C independently is substituted or unsubstituted (C1-C18)hydrocarbyl; (C1-C18)heterohydrocarbyl; each $^R$P independently is substituted or unsubstituted (C1-C18)hydrocarbyl; (C1-C18) heterohydrocarbyl; and each $^R$N independently is substituted or unsubstituted (C1-C18)hydrocarbyl; (C1-C18)heterohydrocarbyl or absent (e.g., when the N to which $^R$N is bonded as —N=);

each of R$^{3a}$, R$^{4a}$, R$^{3b}$ and R$^{4b}$, independently, is a hydrogen atom; (C1-C40) hydrocarbyl; (C1-C40)heterohydrocarbyl; Si($^R$C)$_3$; O($^R$C); S($^R$C); N($^R$N)$_2$; P($^R$P)$_2$ or halogen atom; wherein $^R$C, $^R$N and $^R$P are defined above;

at least one of R$^{6c}$, R$^{7c}$, and R$^{8c}$, and at least one of R$^{6d}$, R$^{7d}$, and R$^{8d}$, independently, are (C2-C40)hydrocarbyl; Si(Rc)$_3$, and each of the others of R$^{6c}$, R$^{7c}$, R$^{8c}$, R$^{6d}$, R$^{7d}$, and R$^{8d}$, independently, is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$; or halogen atom; wherein $^R$C, $^R$N and $^R$P are defined above; and optionally two or more R groups (from R$^{3a}$ to R$^{8d}$) can combine together into one or more ring structures, with such ring structures having from 3 to 50 atoms in the ring not counting hydrogen atoms;

at least one of R$^{5c}$ and R$^{5f}$, independently, is a (C1-C40) hydrocarbyl; (C1-C40)heterohydrocarbyl; Si($^R$C)$_3$; O($^R$C); S($^R$C); N($^R$N)$_2$; P($^R$P)$_2$; or halogen atom; and the other of R$^{5c}$ and R$^{5f}$, independently, is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$ or halogen atom; wherein $^R$C, $^R$N and $^R$P are defined above;

at least one of R$^{5cc}$ and R$^{5ff}$ independently is a (C1-C40) hydrocarbyl; (C1-C40)heterohydrocarbyl; Si($^R$C)$_3$; O($^R$C); S($^R$C); N($^R$N)$_2$; P($^R$P)$_2$ or halogen atom; and the other of R$^{5cc}$ and R$^{5ff}$ independently is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$; or halogen atom; wherein $^R$C, $^R$N and $^R$P are defined above;

each of R$^{9a}$, R$^{10a}$, R$^{11a}$, R$^{9b}$, R$^{10b}$, R$^{11b}$, R$^{9aa}$, R$^{10aa}$, R$^{11aa}$, R$^{9bb}$, R$^{10bb}$ and R$^{11bb}$, independently, is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$; or halogen atom; wherein $^R$C, $^R$N and $^R$P are defined above; and optionally two or more carbazole R groups (e.g. R$^{9a}$, R$^{10a}$, R$^{5a}$, R$^{11a}$, R$^{9b}$, R$^{10b}$, R$^{5f}$, R$^{11b}$) can combine together into one or more ring structures, with such ring structures having from 3 to 50 atoms in the ring not counting hydrogen atoms;

each of the aforementioned hydrocarbyl (e.g., $^R$C, $^R$N, $^R$P, (C1-C40)hydrocarbyl), heterohydrocarbyl (e.g., (C1-C40) heterohydrocarbyl), hydrocarbylene (e.g., (C1-C40)hydrocarbylene), and heterohydrocarbylene (e.g., (C1-C40)heterohydrocarbylene) groups, independently, is unsubstituted or substituted with at least one substituent R$^S$ (up to and including persubstitution by R$^S$);

the sum of carbon atoms in R$^{5c}$+R$^{5f}$+R$^{7c}$ is greater than 5 carbon atoms or the sum of carbon atoms in R$^{5cc}$+R$^{5ff}$+R$^{7d}$ is greater than 5 carbon atoms; and each R$^S$, independently, is a halogen atom, polyfluoro substitution (that is one of the at least one substituent R$^S$ stands for at least two fluoro substituents, which formally replace at least two hydrogen atoms of an unsubstituted version of the substituted group), perfluoro substitution (that is the one R$^S$ stands for as many fluoro substituents as hydrogen atoms of an unsubstituted version of the substituted group that is substituted thereby), unsubstituted (C1-C18)alkyl, F$_3$C—, FCH$_2$O—, F$_2$HCO—, F$_3$CO—, R$_3$Si—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the R$^S$ are taken together to form an unsubstituted (C1-C18)alkylene, wherein each R independently is an unsubstituted (C1-C18)alkyl; and wherein the polymerization is conducted in a continuous process; and wherein interpolymer has a rheology ratio (V0.1/V100 at 190° C., as measured from dynamic mechanical spectroscopy) greater than, or equal to, 20.

BRIEF DESCRIPTION OF THE DRAWINGS

FIG. 1 depicts 13C NMR profiles of inventive and comparative ethylene/α-olefin/nonconjugated polyene interpolymers.

DETAILED DESCRIPTION OF THE INVENTION

As discussed above, the invention provides a solution polymerization process to form an ethylene/α-olefin/nonconjugated polyene interpolymer, said process comprising polymerizing ethylene, an α-olefin, and a nonconjugated polyene in at least one reactor in the presence of a metal-ligand complex (catalyst) selected from Formula I:

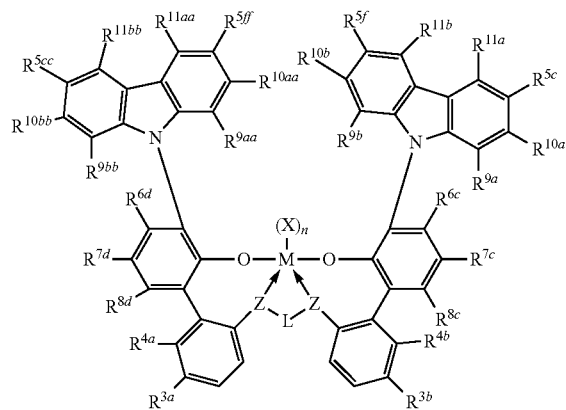

wherein the substituents are described above:

and wherein the polymerization is conducted in a continuous process; and wherein interpolymer has a rheology ratio (V0.1/V100 at 190° C., as measured from dynamic mechanical spectroscopy) greater than, or equal to, 20.

In one embodiment, each Z is O.

The inventive process may comprise a combination of two or more embodiments described herein.

The metal-ligand complex may comprise a combination of two or more embodiments described herein.

In one embodiment, the interpolymer has a rheology ratio (V0.1/V100 at 190° C.) greater than, or equal to, 30. In a further embodiment, the interpolymer has a rheology ratio (V0.1/V100 at 190° C.) greater than, or equal to, 40.

In one embodiment, the ethylene/α-olefin/nonconjugated polyene interpolymer is an ethylene/α-olefin/dene interpolymer. In a further embodiment, the interpolymer is an EPDM.

In a further embodiment, the diene is ENB.

In one embodiment, M is a metal of any one of Groups 4 to 5 of the Periodic Table of the Elements.

In one embodiment, M is a metal of any one of Group 4 of the Periodic Table of the Elements. In a further embodiment, the metal is Zr, Ti or Hf. In a further embodiment, the metal is Ti or Hf. In a further embodiment, the metal is Hf.

In one embodiment, each Z is O. In a further embodiment, the metal-ligand complex of formula (I) is a metal-ligand complex of formula (Ia):

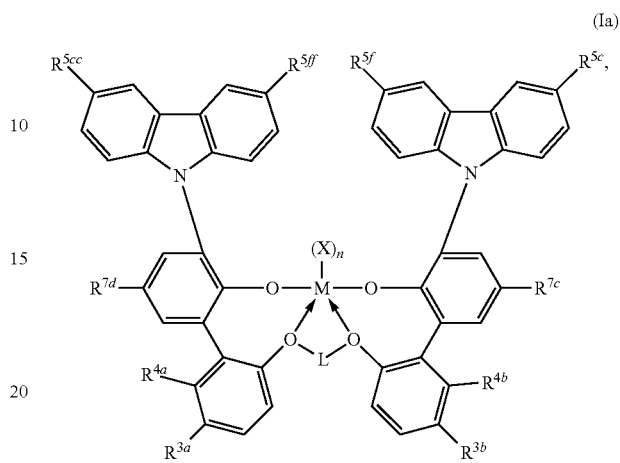

and $R^{7c}$ and $R^{7d}$ are each independently a $(C_4-C_{40})$hydrocarbyl. Here, M, L, X, n, $R^{3a}$, $R^{4a}$, $R^{3b}$, $R^{4b}$, $R^{5c}$, $R^{5f}$, $R^{5cc}$ and $R^{5ff}$ are each defined above. In a further embodiment, the metal-ligand complex of formula (I) is a metal-ligand complex of formula (Ia-1):

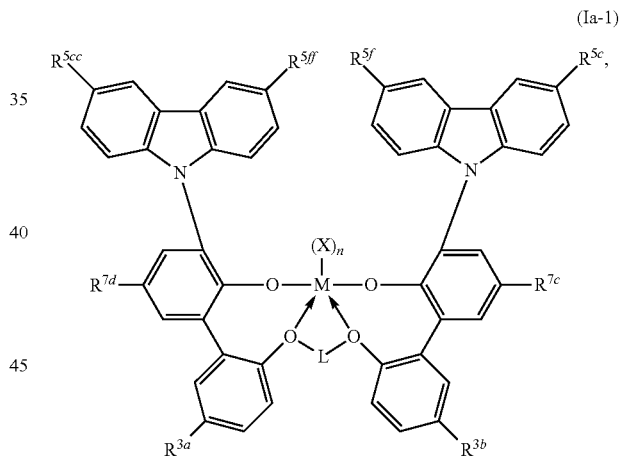

wherein $R^{7c}$ and $R^{7d}$ are each independently a $(C_4-C_{40})$hydrocarbyl. Here, M, L, X, n, $R^{3a}$, $R^{3b}$, $R^{5c}$, $R^{5f}$, $R^{5cc}$ and $R^{5ff}$ are each defined above.

In one embodiment, for a metal-ligand complex as described herein, each of $R^{5c}$, $R^{5f}$, $R^{5cc}$, and $R^{5ff}$ independently is $(C_1-C_{40})$hydrocarbyl. In a further embodiment, each of $R^{5c}$, $R^{5f}$, $R^{5cc}$, and $R^{5ff}$ independently is $(C_1-C_{20})$ hydrocarbyl. In a further embodiment, each of $R^{5c}$, $R^{5f}$, $R^{5cc}$, and $R^{5ff}$ independently is $(C_1-C_{10})$ hydrocarbyl. In a further embodiment, each of $R^{5c}$, $R^{5f}$, $R^{5cc}$, and $R^{5ff}$ independently is $(C_4-C_8)$alkyl or phenyl.

In one embodiment, for a metal-ligand complex as described herein, each of $R^{7c}$ and $R^{7d}$ independently is $(C_4-C_{10})$hydrocarbyl. In a further embodiment, each of $R^{7c}$ and $R^{7d}$ independently is $(C_4-C_8)$alkyl.

In one embodiment, for a metal-ligand complex as described herein, each of $R^{3a}$ and $R^{3b}$ independently is $(C_1-$ $C_6$)alkyl, ($C_1$-$C_6$)alkyl-O—, (($C_1$-$C_6$)alkyl)$_2$-N—, ($C_3$-$C_6$) cycloalkyl, fluorine atom, or chlorine atom. In a further embodiment, each of $R^{3a}$ and $R^{3b}$ independently is a fluorine atom or chlorine atom.

In one embodiment, for a metal-ligand complex as described herein, $R^{3a}$, $R^{3b}$, $R^{5c}$, $R^{5f}$, $R^{5cc}$, $R^{5ff}$, $R^{7c}$, and $R^{7d}$ are not hydrogen atoms, and $R^{3a}$ and $R^{3b}$ are the same as each other; $R^{7c}$ and $R^{7d}$ are the same as each other; and $R^{5c}$ and $R^{5f}$ are respectively the same as $R^{5cc}$ and $R^{5ff}$.

In one embodiment, for a metal-ligand complex as described herein, L is the ($C_1$-$C_{40}$)hydrocarbylene that has a portion that comprises a 1-carbon atom to 6-carbon atom linker backbone linking the Z atoms in formula (I). In a further embodiment, L is —CH$_2$CH$_2$CH$_2$—.

In one embodiment, for a metal-ligand complex as described herein, L is the ($C_1$-$C_{20}$)hydrocarbylene, further a ($C_1$-$C_{10}$) hydrocarbylene, further a ($C_1$-$C_5$)hydrocarbylene. In a further embodiment, L is —CH$_2$CH$_2$CH$_2$—. Hydrocarbylene-formed by removing two hydrogen atoms from a hydrocarbon.

In one embodiment, for a metal-ligand complex as described herein, each X is independently a (C1-C8) alkyl, a (C1-C6) alkyl, a (C1-C4) alkyl, or a (C1-C3) alkyl, further a (C1-C4) alkyl, or a (C1-C3) alkyl, and further a (C1-C3) alkyl.

In one embodiment, for a metal-ligand complex as described herein, M is the metal of Group 4 of the Periodic Table of the Elements, the metal of Group 4 being hafnium, zirconium, or titanium. In a further embodiment, M is hafnium, the hafnium, and further hafnium being in a formal oxidation state of +4; and n is 2 or 3. In a further embodiment, each X is independently a (C1-C8) alkylene, a (C1-C6) alkylene, a (C1-C4) alkylene, or a (C1-C3) alkylene. In a further embodiment, L is —CH$_2$CH$_2$CH$_2$—.

In one embodiment, the metal-ligand complex of formula (I) is a metal-ligand complex of formula (Ia-1):

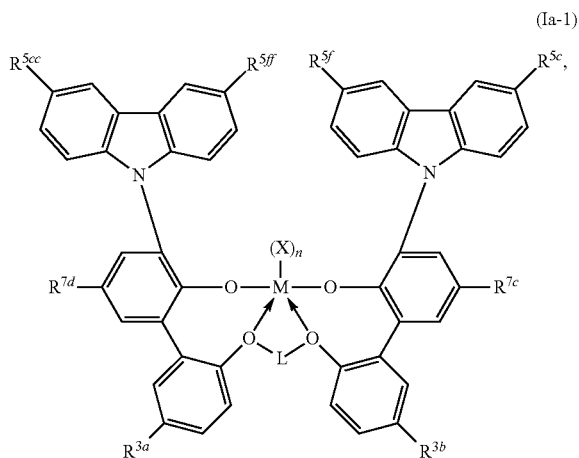

(Ia-1)

wherein each of $R^{5c}$, $R^{5f}$, $R^{5cc}$, and $R^{5ff}$ independently is ($C_1$-$C_{40}$)hydrocarbyl, further a ($C_1$-$C_{20}$)hydrocarbyl, further a ($C_1$-$C_{10}$)hydrocarbyl, and further each of $R^{5c}$, $R^{5f}$, $R^{5cc}$, and $R^{5ff}$ independently is ($C_4$-$C_8$)alkyl or phenyl;

wherein each of $R^{7c}$ and $R^{7d}$ independently is ($C_4$-$C_{10}$) hydrocarbyl, and further each of $R^{7c}$ and $R^{7d}$ independently is ($C_4$-$C_8$)alkyl;

wherein each of $R^{3a}$ and $R^{3b}$, independently, is ($C_1$-$C_6$) alkyl, ($C_1$-$C_6$)alkyl-O—, (($C_1$-$C_6$)alkyl)$_2$-N—, ($C_3$-$C_6$)cycloalkyl, fluorine atom, or chlorine atom, and further each of $R^{3a}$ and $R^{3b}$ independently is a fluorine atom or chlorine atom, and further each is a fluorine atom;

wherein L is the ($C_1$-$C_{20}$)hydrocarbylene, further a ($C_1$-$C_{10}$)hydrocarbylene, further a ($C_1$-$C_5$)hydrocarbylene, and further L is —CH$_2$CH$_2$CH$_2$—;

wherein M is the metal of Group 4 of the Periodic Table of the Elements, the metal of Group 4 being hafnium, zirconium, or titanium, and further M is hafnium, and n is 2 or 3, and further n is 2; and wherein each X is independently a (C1-C8) alkyl, a (C1-C6) alkyl, a (C1-C4) alkyl, or a (C1-C3) alkyl, further a (C1-C4) alkyl, or a (C1-C3) alkyl, further a (C1-C3) alkyl, and further methyl.

In one embodiment, the metal-ligand complex of formula (I) is (2',2"-(propane-1,3-diylbis(oxy))bis(3-(3,6-di-tert-butyl-9H-carbazol-9-yl)-5'-fluoro-5-(2,4,4-trimethylpentan-2-yl)biphenyl-2-ol)dimethyl-hafnium, (1).

In one embodiment, the metal-ligand complex of formula (I) is [[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafnium dimethyl.

In one embodiment, the polymerization takes place at a polymerization temperature from 80° C. to 220° C. In a further embodiment, the polymerization takes place at a polymerization temperature from 90° C. to 200° C.

In one embodiment, the polymerization takes place at a polymerization temperature from 100° C. to 200° C. In a further embodiment, the polymerization takes place at a polymerization temperature from 120° C. to 190° C. In a further embodiment, the polymerization takes place at a polymerization temperature from 140° C. to 190° C.

In one embodiment, the polymer concentration in reactor is greater than 5 wt %, preferably greater than 10 wt %, and more preferably greater than 15 wt %, based on the total feed to reactor.

In one embodiment, the polymerization takes place in two reactors in series. In a further embodiment, the second reactor temperature is greater than 150° C., and in a further embodiment, greater than 160° C.

In one embodiment, the first reactor temperature is from 90° C. to 160° C., and the second reactor temperature is from 150° C. to 200° C.

The invention also provides an ethylene/α-olefin/nonconjugated polyene interpolymer formed from the process of any embodiment described herein. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the ethylene/α-olefin/nonconjugated polyene interpolymer has a "peak area from 21.3 ppm to 21.8 ppm" greater than 3 percent of the total integral area from 19.5 ppm to 22.0 ppm, as determined by 13C NMR. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the ethylene/α-olefin/nonconjugated polyene interpolymer has a "peak area from 21.3 ppm to 21.8 ppm" greater than 3.5 percent, further greater than, or equal to, 5.0 percent, of the total integral area from 19.5 ppm to 22.0 ppm, as determined by 13C NMR. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the interpolymer is a homogeneously branched substantially linear ethylene/α-olefin copolymer.

In one embodiment, the interpolymer has an "ethylene to α-olefin" molar ratio from 70/30 to 40/60.

In one embodiment, the interpolymer has an "ethylene to α-olefin" molar ratio from 85/15 to 65/35.

In one embodiment, the interpolymer has a polyene weight % content from 0.1 to 15 wt %, preferably from 0.4 to 10 wt %, based on the total weight of the interpolymer.

The invention also provides an ethylene/α-olefin/nonconjugated polyene interpolymer that has a rheology ratio (V0.1/V100 at 190° C.) greater than, or equal to, 20, and a "peak area from 21.3 ppm to 21.8 ppm" greater than 3 percent, further greater than 3.5 percent, further greater than, or equal to, 5.0 percent, of the total integral area from 19.5 ppm to 22.0 ppm, as determined by 13C NMR. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the interpolymer has a rheology ratio (V0.1/V100 at 190° C.) greater than, or equal to, 30. In a further embodiment, the interpolymer has a rheology ratio (V0.1/V100 at 190° C.) greater than, or equal to, 40. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the interpolymer is a homogeneously branched substantially linear ethylene/α-olefin copolymer.

In one embodiment, the interpolymer has an "ethylene to α-olefin" molar ratio from 70/30 to 40/60.

In one embodiment, the interpolymer has an "ethylene to α-olefin" molar ratio from 85/15 to 65/35.

In one embodiment, the interpolymer has a polyene weight % content from 0.1 to 15 wt %, preferably from 0.4 to 10 wt %, based on the total weight of the interpolymer.

An inventive ethylene/α-olefin/nonconjugated polyene interpolymer may comprise a combination of two or more embodiments described herein.

The invention also provides a composition comprising an ethylene/α-olefin/nonconjugated polyene interpolymer of any embodiment described herein. In a further embodiment, the composition comprises at least one additive.

In one embodiment, the composition comprises greater than, or equal to, 40 weight percent, or greater than, or equal to 50 weight percent, or greater than, or equal to 60 weight percent of the interpolymer, based on the weight of the composition.

In one embodiment, the composition comprises greater than, or equal to, 80 weight percent, or greater than, or equal to 90 weight percent, or greater than, or equal to 95 weight percent of the interpolymer, based on the weight of the composition.

In one embodiment, the composition comprises at least one filler. In a further embodiment, the filler is selected from the group consisting of carbon black, CaCO3, silica, and combinations thereof. In a further embodiment, the filler is selected from the group consisting of carbon black, CaCO3, and combinations thereof.

In one embodiment, the composition comprises at least one filler. In a further embodiment, the composition comprises less than 70 weight percent, or less than 60 weight percent, or less than 50 weight percent, of the filler, based on the weight of the composition. In a further embodiment, the filler is carbon black.

In one embodiment, the composition comprises at least one filler. In a further embodiment, the composition comprises greater than 20 weight percent, or greater than 25 weight percent, or greater than 30 weight percent, of the filler, based on the weight of the composition. In a further embodiment, the filler is carbon black.

The invention also provides a crosslinked composition formed from an inventive composition.

The invention also provides an article comprising at least one component formed from an inventive composition. In one embodiment, the article is a foam. In a further embodiment, the article is an automotive part. In another embodiment, the article is a building profile.

The invention also provides an article comprising at least one component formed from an inventive crosslinked composition. In one embodiment, the article is a foam. In a further embodiment, the article is an automotive part. In another embodiment, the article is a building profile.

An inventive process may comprise a combination of two or more embodiments described herein.

The metal-ligand complex of Formula (I) may comprise a combination of two or more embodiments described herein.

The metal-ligand complex of Formula (Ia) may comprise a combination of two or more embodiments described herein.

The metal-ligand complex of Formula (Ia-1) may comprise a combination of two or more embodiments described herein.

An inventive ethylene/α-olefin/nonconjugated polyene interpolymer may comprise a combination of two or more embodiments described herein.

An inventive composition may comprise a combination of two or more embodiments described herein.

An inventive crosslinked composition may comprise a combination of two or more embodiments as described herein.

An inventive article may comprise a combination of two or more embodiments described herein.

It has been discovered that the inventive polymerization described herein produce EPDM's that are higher in molecular weight, and contain higher levels of long chain branching, and higher levels of ENB incorporation. The higher levels of long chain branching in the polymer enable EPDM polymers to be used in processes that require good melt strength, such as calendaring and sponge foaming. Polymers with a combination of high molecular weight, high long chain branching, and high ENB levels typically are used for weather-strip sponge, such as those used in primary door seals in automotive applications.

Ethylene/α-Olefin/Nonconjugated Polyenes Interpolymers

The ethylene/α-olefin/nonconjugated polyene interpolymers comprise, in polymerize form, ethylene, an α-olefin, and a nonconjugated polyene. Suitable examples of α-olefins include the C3-C10 α-olefins, and preferably propylene. Suitable nonconjugated polyenes include nonconjugated dienes. Suitable examples of nonconjugated dienes include the C4-C40 nonconjugated dienes.

The α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a preferred embodiment, the interpolymer is an ethylene/propylene/diene (EPDM) terpolymer. In a further embodiment, the diene is 5-ethylidene-2-norbornene (ENB).

Illustrative nonconjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The diene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, the ethylene/α-olefin/nonconjugated polyene interpolymer comprises a majority amount of polymerized ethylene, based on the weight of the interpolymer. In a further embodiment, the ethylene/α-olefin/nonconjugated polyene interpolymer is an ethylene/α-olefin/dene interpolymer. In a further embodiment, the interpolymer is an EPDM. In a further embodiment, the diene is ENB.

In one embodiment, the ethylene/α-olefin/nonconjugated polyene interpolymer has a molecular weight distribution (Mw/Mn) from 1.5 to 3.5, or from 1.8 to 3.0, or from 2.0 to 2.5. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., greater than, or equal to, 15, or greater than, or equal to, 30, or greater than, or equal to 50, or greater than, or equal to 70. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., less than 200, or less than, or equal to, 150, or less than, or equal to, 100. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., from 15 to 200, or from 50 to 150, or from 70 to 100. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

Mooney viscosity is that of the neat interpolymer (or—calculated viscosity of neat polymer for polymers that contain a filler, such as carbon black, and/or an oil). The neat polymer refers to the polymer without filler and without oil.

An ethylene/α-olefin/nonconjugated polyene interpolymer may comprise a combination of two or more embodiments as described herein.

An ethylene/alpha-olefin/diene interpolymer may comprise a combination of two or more embodiments as described herein.

An EPDM terpolymer may comprise a combination of two or more embodiments as described herein.

Additives

An inventive composition may comprise one or more additives. Suitable additives include, but are not limited to, fillers, antioxidants, UV stabilizers, flame retardants, plasticizers or oils, cross linking agents, colorants or pigments, and combinations thereof.

Fillers include, but are not limited to, carbon black; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; phenol-formaldehyde, polystyrene, and poly(alphamethyl)-styrene resins, natural fibers, synthetic fibers, and the like.

Plasticizers include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

Antioxidants and antiozonants include, but are not limited to, hindered phenols, bisphenols, and thiobisphenols; substituted hydroquinones; tris(alkylphenyl)phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine, hexahydro-1,3,5-tris-β-(3,5-di-t-butyl-4-hydroxyphenyl)propionyl-s-triazine, 2,4,6-tris(n-1,4-dimethylpentylphenylene-diamino)-1,3,5-triazine, tris-(3,5-di-t-butyl-4-hydroxybenzyl)isocyanurate, nickel dibutyldithiocarbamate, 2-mercaptotolylimidazole and its zinc salt, petroleum waxes, and the like.

Crosslinking agents include, but are not limited to, peroxides, such as organic peroxides. Illustrative peroxides include, but are not limited to, a series of vulcanizing and polymerization agents that contain α,α'-bis(t-butylperoxy)-diisopropylbenzene, and are available from Hercules, Inc. under the trade designation VULCUP, a series of such agents that contain dicumyl peroxide and are available from Hercules, Inc. under the trade designation DI-CUP as well as LUPERSOL peroxides made by Elf Atochem, North America or TRIGONOX organic peroxides made by Akzo Nobel. The LUPERSOL peroxides include LUPERSOL 101 (2,5-dimethyl-2,5-di(t-butylperoxy)hexane), LUPERSOL 130 (2,5-dimethyl-2,5-di(t-butylperoxy)hexyne-3) and LUPERSOL 575 (t-amyl peroxy-2-ethylhexonate). Other suitable peroxides include 2,5-dimethyl-2,5-di-(t-butyl peroxy)hexane, di-t-butylperoxide, di-(t-amyl)peroxide, 2,5-di(t-amyl peroxy)-2,5-dimethylhexane, 2,5-di-(t-butylperoxy)-2,5-diphenylhexane, bis(alpha-methylbenzyl)peroxide, benzoyl peroxide, t-butyl perbenzoate, 3,6,9-triethyl-3,6,9-trimethyl-1,4,7-triperoxonane and bis(t-butylperoxy)-diisopropylbenzene.

In one embodiment, the composition further comprises at least one oil. In a further embodiment, the oil is present in an amount greater than 10 weight percent, or greater than 15 weight percent, or greater than 20 weight percent, based on the weight of the composition.

In one embodiment, the oil is present in an amount less than 60 weight percent, or less than 50 weight percent, or less than 40 weight percent, based on the weight of the composition.

Applications

The compositions of the present invention may be used to prepare a variety of articles or manufacture, or their component parts or portions. The inventive compositions may be converted into a finished article of manufacture by any one of a number of conventional processes and apparatus. Illustrative processes include, but are not limited to, extrusion, calendering, compression molding, and other typical thermoset material forming processes. For example, articles can be prepared by extrusion, extrusion followed by additional thermal treatment, low pressure molding, compression molding, and the like.

The invention provides an article comprising at least one component formed from an inventive composition.

Articles include, but are not limited to, sheets, foams molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation.

DEFINITIONS

Unless stated to the contrary, implicit from the context, or customary in the art, all parts and percents are based on weight, and all test methods are current as of the filing date of this disclosure.

A continuous polymerization process is a process conducted at steady-state, with continuous feeds and continuous removal of product. Such processes include, but are not limited to, one or more well-mixed loop reactor(s) and/or stirred tank reactor(s) and/or plug-flow reactors, and where multiple reactors can be operated in sequence and/or parallel.

A batch process is a process conducted in a batch-wise fashion, such as the reactants and monomers are added once, and then partially or totally consumed during the reaction. Batch reactors are operated at non-steady states, since the reactants are consumed with time.

A semi-batch process is operated with both continuous and batch inputs and outputs. One chemical reactant is charged to the reactor vessel and a second chemical is added slowly (over time). For example, ethylene and propylene are fed continuously to a polymerization, while the solvent and termonomer are added only at the beginning of the reaction. Semi-batch reactors are operated at non-steady states, since some of the reactants are consumed with time.

The term "hydrocarbyl," as used herein refers to a univalent group which is formed by removing a hydrogen atom from a hydrocarbon (chemical group containing only carbon and hydrogen atoms).

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, can be incorporated into and/or within the polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene-based polymer," as used herein, refers to a polymer that comprises, in polymerized form, a majority weight percent of ethylene (based on the weight of the polymer), and optionally may comprise one or more comonomers.

The term "ethylene-based interpolymer," as used herein, refers to a polymer that comprises, in polymerized form, a majority weight percent of ethylene (based on the weight of the interpolymer), and at least one comonomer.

The term "ethylene/α-olefin/nonconjugated polyene interpolymer," as used herein, refers to a polymer that comprises, in polymerized form, ethylene, an α-olefin, and a nonconjugated polyene. In one embodiment, the "ethylene/α-olefin/nonconjugated polyene interpolymer," comprises a majority weight percent of ethylene (based on the weight of the interpolymer).

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer," comprises a majority weight percent of ethylene (based on the weight of the interpolymer).

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

FTIR Method for EPDM Composition Analysis

The terpolymers containing ethylene, propylene, and ethylidenenorbornene were analyzed using ASTM D9300 for its ethylene content, and ASTM D6047 for its ethylidenenorbornene or dicyclopentadiene content.

C13 NMR Method for EPDM Composition Analysis

The samples were prepared by adding approximately "2.6 g of a 50/50 mixture of tetrachloroethane-d2/orthodichlorobenzene containing 0.025M in chromium acetylacetonate (relaxation agent)" to "0.2 g sample" in a "10 mm" NMR tube. The samples were dissolved and homogenized by heating the tube and its contents to 150° C. The data were collected using a Bruker 400 MHz spectrometer, equipped with a Bruker Dual DUL high-temperature CryoProbe. The data was acquired using 160 scans per data file, a 6 second pulse repetition delay, with a sample temperature of 120° C. The acquisition was carried out using a spectral width of 25,000 Hz and a file size of 32K data points.

NMR spectral analyses of the composition of the examples were carried out using the following analysis method. Quantitation of monomers present in EPDM can be calculated using the following equations (1 through 9).

The calculation of moles ethylene normalizes the spectral range from 55.0-5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{(1000 - 3*molesP - 7*molesENB)}{2} \quad \text{Equation 1}$$

$$molesENB = CH3(13.6 - 14.7 \text{ ppm}) \quad \text{Equation 2}$$

$$molesP = CH3(19.5 - 22.0 \text{ ppm}) \quad \text{Equation 3}$$

$$\text{mole \% ethylene} = \frac{100*molesE}{molesE + molesP + molesENB} \quad \text{Equation 4}$$

$$\text{mole \% propylene} = \frac{100*molesP}{molesE + molesP + molesENB} \quad \text{Equation 5}$$

$$\text{mole \% ENB} = \frac{100*molesENB}{molesE + molesP + molesENB} \quad \text{Equation 6}$$

$$\text{Wt \% ethylene} = \frac{100*\text{moles \% } E*28}{\text{mole \% } E*28 + \text{mole \% } P*42 + \text{mole \% } ENB*120} \quad \text{Equation 7}$$

$$\text{Wt \% propylene} = \frac{100*\text{mole \% } P*42}{\text{mole \% } E*28 + \text{mole \% } P*42 + \text{mole \% } ENB*120} \quad \text{Equation 8}$$

$$\text{Wt \% ENB} = \frac{100*\text{mole \% } ENB*120}{\text{mole \% } E*28 + \text{mole \% } P*42 + \text{mole \% } ENB*120} \quad \text{Equation 9}$$

Further NMR spectral analysis of some inventive interpolymers displays a peak area, from 21.3 ppm to 21.8 ppm, greater than 3% of the total integral area from 19.5 ppm to 22.0 ppm. Similar spectral analysis of a comparative example, show less than 3% of the total integral area from 19.5 ppm to 22.0 ppm (see FIG. 1). Spectral data are referenced to the EEE backbone at 30 ppm. Peak responses in this region have been typically related to differences in propylene tacticity incorporated into the polymer.

Dynamic Mechanical Spectroscopy (DMS)

Small angle oscillatory shear (melt DMS) were performed using a TA Instruments ARES, equipped with 25 mm parallel plates, under a nitrogen purge. The time between sample loading and beginning of the test was set to five minutes for all samples. The experiments were performed at 190° C. over a frequency range of 0.1 to 100 rad/s. The strain amplitude was adjusted, based upon the response of the samples, from 1 to 3%. The stress response was analyzed in terms of amplitude and phase, from which the storage modulus (G'), loss modulus (G"), dynamic viscosity η* and tan delta were calculated.

Specimens for Dynamic Mechanical Spectroscopy are "25 mm diameter×3.3 mm thick" compression molded discs, formed at 180° C. and 10 MPa molding pressure, for five minutes, and then quenched between chilled platents (15-20° C.) for two minutes. The rheology ratio, the ratio of the complex viscosity measured at 0.1 rad/s and the complex viscosity measured at 100 rad/s (V0.1/V100 measured at 190° C.; also referred to as "RR") was recorded. A linear molecule (no detectable long chain branching) typically has a RR of 8 or less.

Mooney Viscosity

Interpolymer (EPDM with no filler and no oil) Mooney Viscosity (ML1+4 at 125° C.) is measured in accordance with ASTM 1646-04, with a one minute preheat time and a four minute rotor operation time. The instrument is an Alpha Technologies Rheometer MDR 2000.

For dual reactor polymerizations in series, the Mooney viscosity of the second reactor component is determined by the following equation: log ML=n(A) log ML(A)+n(B) log ML(B); where ML is the Mooney viscosity of the final reactor product, ML(A) is the Mooney viscosity of the first reactor polymer, ML(B) is the Mooney viscosity of the second reactor polymer, n(A) is the weight fraction of the first reactor polymer, and n(B) is the weight fraction of the second reactor polymer. Each measured Mooney viscosity is measured as discussed above. The weight fraction of the second reactor polymer is determined as follows: n(B)=1−n(A), where n(A) is determined by the known mass of first polymer transferred to the second reactor.

Gel Permeation Chromatography

The chromatographic system consisted of either a Polymer Laboratories Model PL-210 or a Polymer Laboratories Model PL-220. The column and carousel compartments were operated at 140° C. The columns used were three Polymer Laboratories, 10-micron Mixed-B columns. The solvent used was 1,2,4 trichlorobenzene. The samples were prepared at a concentration of "0.1 gram of polymer in 50 milliliters of solvent." The solvent used to prepare the samples contained 200 ppm of butylated hydroxytoluene (BHT). Samples were prepared by agitating lightly for 2 hours at 160° C. The injection volume was 100 microliters, and the flow rate was 1.0 milliliters/minute.

Calibration of the GPC column set was performed with 21 narrow molecular weight distribution polystyrene standards, with molecular weights ranging from 580 to 8,400,000, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing highest molecular weight component to minimize degradation. The polystyrene standard peak molecular weights were converted to polyethylene molecular weights using the following equation, $M_{polyethylene} = A \times (M_{polystyrene})^B$, where M is the molecular weight, A has a value of 0.431 and B is equal to 1.0. Polyethylene equivalent molecular weight calculations were performed using Viscotek TriSEC software Version 3.0.

Melt Index Measurement

Melt index (I2) of an ethylene-based polymer is measured in accordance with ASTM D-1238, condition 190° C./2.16 kg. Melt index (I5) of an ethylene-based polymer is measured in accordance with ASTM D-1238, condition 190° C./5.0 kg. Melt index (I10) of an ethylene-based polymer is measured in accordance with ASTM D-1238, condition 190° C./10.0 kg. High load melt index (I21) of an ethylene-based polymer is measured in accordance with ASTM D-1238, condition 190° C./21.0 kg.

Polymer Density

Polymer density is measured in accordance with ASTM D-792.

EXPERIMENTAL

Ethylene/Propylene/ENB Terpolymerizations in a Semi-Batch Reactor

CAT-37 [[2′,2′′′-[1,3-propanediylbis(oxy-kO)]bis[3-[3,6-bis(1,1-dimethylethyl)-9H-carbazol-9-yl]-5′-fluoro-5-(1,1,3,3-tetramethylbutyl)[1,1′-biphenyl]-2-olato-kO]](2-)]-hafnium dimethyl (used in the inventive polymerization).

CAT-01[N-(1,1-dimethylethyl)-1,1-dimethyl-1-[(1,2,3,3a,8a-η)-1,5,6,7-tetrahydro-2-methyl-s-indacen-1-yl]silanaminato(2-)-κN][(1,2,3,4-η)-1,3-pentadiene]-titanium (comparative polymerization).

CAT-37 and CAT-01 were used in a semi-batch reactor to produce EPDM polymers at five different reaction conditions. These conditions, depicted in Table 1 were chosen so that the concentration of each monomer, in the liquid phase where polymerization occurs, was held approximately constant as temperature was varied from 175° C. to 95° C. For each sample, produced with each catalyst, a one gallon stirred autoclave reactor was initially charged with the amounts of 5-ethylidene-2-norbornene, ISOPAR-E (mixed alkanes) solvent, and propylene (see Table 1). The reactor was then heated to the desired temperature, while being charged with hydrogen (20 mmol). Finally, the appropriate amount of ethylene was added, to bring the total pressure up to the desired value listed in Table 1.

The catalyst composition was prepared in a dry box under inert atmosphere by mixing, in the case of CAT-37, 100 equivalents of triisobutylaluminum modified alumoxane (MMAO-3A), 1.2 equiv catalyst activator (bis(hydrogenated tallow alkyl)methyl amines), and 1 equivalents of catalyst, with additional solvent, to give a total volume of approximately 10 mL. For CAT-01, 10 equivalents of MMAO-3A were mixed with 3 equivalents catalyst activator (tris(2,3,4,5,6-pentafluorophenyl)borane), one equivalent of catalyst, and additional solvent, to give a total volume of approximately 10 mL. The activated catalyst mixture was injected into the reactor over 4 minutes by a pump system, or quick injected through a catalyst cylinder. The reactor pressure and temperature were kept constant by feeding ethylene during the polymerization and cooling the reactor as needed. After 10 minutes, the ethylene feed was shut off, and the solution transferred into a nitrogen-purged resin kettle. An additive solution, containing a phosphorus stabilizer and phenolic antioxidant (IRGAFOS 168 and IGANOX 1010 in a "2:1 ratio by weight" in toluene), is added, to give a total additive content of approximately 0.1 wt % in the polymer. The polymer is thoroughly dried in a vacuum oven. The reactor is thoroughly rinsed with hot ISOPAR-E between polymerizations.

Table 2 lists the amount of catalyst injected into the reactor for each batch reactor sample, as well as the observed catalyst efficiency. The reaction conditions used at each temperature are given in Table 1. The number average (Mn) and weight average (Mw) molecular weights of each sample were measured using Gel Permeation Chromatography (GPC), and the weight fraction of each monomer in the final terpolymer was determined using 13-C NMR. The glass transition temperature was determined using Differential Scanning calorimetry.

TABLE 1

Batch Reactor Conditions (EPDM)

| Run # | Temp (° C.) | P psig | $H_2$ mmol | C3 (g) | ENB (g) | ISOPAR E (g) | $[C2]^a$ wt % | $[C3]^a$ wt % | $[ENB]^a$ wt % |
|---|---|---|---|---|---|---|---|---|---|
| 1 (CAT-37) | 175 | 417 | 20 | 70 | 12 | 1355 | 3.50% | 4.10 | 0.80% |
| A(CAT-01) | 175 | 417 |  | 70 | 12 | 1355 | 3.50% | 4.10 | 0.80% |

$^a$estimated values

TABLE 2

Polymer Properties

| ID | Amt. Cat (umol) | Mw (GPC) | Mn (GPC) | Mw/Mn (GPC) | Wt % C2 (NMR) | Wt % C3 (NMR) | Wt % ENB (NMR) | $T_g$ (° C.) (DSC) | RR (DMS) | Yield (g) | Efficiency (g poly/g metal) |
|---|---|---|---|---|---|---|---|---|---|---|---|
| 1 | 0.19 | 125,240 | 66,340 | 1.89 | 75.3 | 19 | 5.8 | −29.5 | 5.9 | 23.2 | 684,063 |
| A | 45 | 68,000 | 15,090 | 4.51 | 79.3 | 17.1 | 3.6 | −28.8 | 15.6 | 6 | 2,785 |

CAT-37 and CAT-01 were used in a continuous polymerization process to produce EPDM polymers with the same ethylene, propylene, and ENB composition.

In general terms, it is desirable to produce the inventive polymer under the conditions as explained in U.S. Pat. Nos. 5,977,251 and 6,545,088, and the references therein. The polymer products were produced in a solution polymerization process using a continuously mixed loop reactor.

Ethylene was introduced in a mixture of a solvent of ISOPAR E (a mixture of C8-C10 saturated hydrocarbons available from ExxonMobil), propylene and 5-ethylidene-2-norbornene (ENB), forming the reactor feed stream. Catalyst is fed to the reactor separately and activated in-situ, using co-catalyst 1(bis(hydrogenated tallow alkyl)methyl amines) and co-catalyst 2(triisobutylaluminum modified alumoxane (MMAO-3A)). The outlet of the reactor was consequently a mixture of polymer, solvent, and reduced levels of the initial monomer streams. The molecular weight of the polymer may be controlled by adjusting reactor temperature, monomer conversion and/or the addition of a chain terminating agent, such as hydrogen. The polymerization reactions were performed under steady state conditions, that is, constant reactant concentration and continual input of solvent, monomers, and catalyst, and withdrawal of unreacted monomers, solvent and polymer. The reactor system was cooled and pressured to prevent formation of a vapor phase.

After polymerization, a small amount of water was introduced into the reactor exit stream as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and recycled back to the reactor feeds as appropriate. Typically, prior to devolatilization, an additive solution, containing a phosphorus stabilizer and phenolic antioxidant (IRGAFOS 168 and IGANOX 1010 in a "2:1 ratio by weight"), is added, to give a total additive content of approximately 0.1 wt % in the polymer.

Table 3a and 3b show the polymerization conditions used for the terpolymerization of ethylene/propylene and ENB using CAT-37 and CAT-01 at 162° C. and 94° C., respectively. Table 4 shows the resultant properties of the polymers.

Comparing the data from these two polymerizations, the inventive example shows similar catalyst efficiency to the comparative example (1.3 MM lb polymer/lb metal), despite being polymerized at a significantly higher temperature (162° C. versus 94° C.).

Inventive example 2, polymerized at 162° C., had a weight average molecular weight of 160,881 g/mol, and incorporated 70.6 weight percent of ethylene, 21.8 weight percent of propylene and 7.6 weight percent of ENB. Comparative example B, polymerized at 94° C., had a weight average molecular weight of 221,870 g/mol, and incorporated 70.3 weight percent of ethylene, 25.0 weight percent of propylene and 4.7 weight percent of ENB. Strikingly, the rheology ratio of example 2 is 48.5 while the rheology ratio of example B* is 30.3.

Another unique feature is that the Mooney Viscosity of the Inventive example 2 is sufficiently high, at 80 (ML1+4, 125° C.), indicating that it is high in viscosity as a result of its molecular weight and long chain branching. The Mooney Viscosity of the Comparative example B is 134 (ML1+4, 125° C.), indicating it is high in viscosity, but from the rheology ratio of 30, it can be inferred that the long chain branching level is significantly lower than that of the inventive example. Despite the molecular weight difference between these two polymers (but both polymers having a polydispersity (Mw/Mn) of 2.3), it was discovered that the inventive polymer, with the lower molecular weight, had a significantly higher rheology ratio (V0.1/V100 at 190° C.). For increasing molecular weight of the polymer, it is expected that the rheology to increase slightly, but not as dramatically as shown, when comparing the molecular weight and rheology ratio for inventive and comparative examples.

The high rheology ratio (V0.1/V100 at 190° C.) of the inventive example also demonstrates that the polymer is highly branched, to influence the shear viscosity at both the low and high shear rates. A high viscosity at a low shear rate is important for polymer melt strength and compound green strength, and a low viscosity at a high shear rate is critical for mixing and dispersion of the components used in formulating EPDM compounds. Thus, high "rheology ratio EPDM" can result in better processability and higher melt strength, which are especially needed in applications such as sponge blowing and foaming and extruded profiles. Other benefits include faster and easy mixing and dispersion of the polymer along with the other ingredients such as carbon black, oils, curatives, and other additives. Faster and easier mixing results in less torque and power consumption by the mixer and the equipment. EPDM polymer that readily disperses into compounds can also results in a better looking articles, with improved surface quality (which is important for an extruded weatherstrip profile).

Examples EPDM01-R1, EPDM01, EPDM02, and EPDM03 also demonstrate the inventive features that were produced using CAT-37, in a continuous polymerization operation, in both a single and dual reactor process. EPDM01 was prepared using two consecutive loop reactors (first reactor: loop; second (final) reactor: loop). EPDM02 and EPDM03 were each prepared using a loop reactor followed by a continuous stirred-tank reactor (first reactor: loop; second (final) reactor: CSTR). Examples designated with "—R1" are of the materials sampled from the first reactor, and are representative of the polymer composition that is fed to the second reactor. Example EPDM01-R1 and EPDM01 polymers were produced at high temperatures of 147° C. and 175° C., respectively. Compared to example 2, these polymers are lower in Mooney Viscosity, 40.5 Mooney units and 21.5 Mooney units, respectively. Despite the lower Mooney viscosity, the rheology ratio (V0.1/V100) of these polymers are uniquely high, with values of 65.5 and 37.7. The EPDM01 is the composition of the polymer exiting the second reactor, and includes the polymer composition produced from both the first and second reactor. It can be included that these polymer composition contains high levels of long chain branching.

EPDM02-R1, EPDM02, and EPDM03-R1, EPDM03 illustrate the examples produced at lower temperatures, 90° C. for the first reactor, and between 130-140° C. for the second reactor. The final Mooney Viscosity of the EPDM02 and EPDM03 examples were 76.0 Mooney units and 73.9 Mooney units, respectively. The rheology ratio (V0.1/V100) of these dual reactor polymers, EPDM02 and EPDM03 polymers are also high, with values of 29.4 and 26.2.

TABLE 3a

| | Polymerization Conditions (EPDM, Continuous Polymerization) | | | | | | |
|---|---|---|---|---|---|---|---|
| Ex. | Reactor Volume, [gal] | Catalyst | Reactor Temp. [deg C.] | Pressure [psig] | Solvent Feed [lb/hr] | Ethylene Feed [lb/hr] | Propylene Feed [lb/hr] | ENB Feed [lb/hr] |
| B (Single Reactor) | 5200 | CAT-01 | 94 | 650 | 120940 | 13803 | 6960 | 1606 |

TABLE 3a-continued

Polymerization Conditions (EPDM, Continuous Polymerization)

| Ex. | Reactor Volume, [gal] | Catalyst | Reactor Temp. [deg C.] | Pressure [psig] | Solvent Feed [lb/hr] | Ethylene Feed [lb/hr] | Propylene Feed [lb/hr] | ENB Feed [lb/hr] |
|---|---|---|---|---|---|---|---|---|
| 2 (Single Reactor) | 12 | CAT-37 | 162 | 525 | 262 | 41 | 31 | 7.7 |
| EPDM01-R1 (first reactor) | 5200 | CAT-37 | 147 | 650 | 73,800 | 10,840 | 7,930 | 1,670 |
| EPDM01 | 5200 | CAT-37 | 175 | 650 | 53,900 | 12,640 | 7,480 | 1,000 |
| EPDM02-R1 | 26 | CAT-37 | 89.8 | 610.3 | 141.37 | 14.8 | 20.98 | 4.61 |
| EPDM02 | 27 | CAT-37 | 138.4 | 603.11 | 49.33 | 9.99 | 15.12 | 1.39 |
| EPDM03-R1 | 26 | CAT-37 | 89.8 | 610.1 | 159.08 | 16.69 | 23.68 | 5.19 |
| EPDM03 | 27 | CAT-37 | 131.1 | 605.57 | 59.06 | 11.32 | 21.54 | 0.92 |

TABLE 3b

Polymerization Conditions Continued

| Ex. | H2 to Ethylene Feed Ratio [Mol/Mol * 100] | C2 Conc. [g/L] | Cat. Efficiency [lb_poly/lb_metal] *10E6 | Cat. Flow [lb/hr] | Cat. Solution Conc. | Cocat.-1 flow [lb/hr] | Cocat.-1 Solution Conc. | Cocat.-2 flow [lb/hr] | Cocat.-2 Solution Conc. [wt %] | Production Rate [lb/hr] |
|---|---|---|---|---|---|---|---|---|---|---|
| B* | 0.27 | 18.3 | 1.33 | 21.4 | 0.42 [wt %] | 13.9 | 3.20 [wt %] | 18.5 | 0.30 [wt %] | 14504 |
| 2 | 0.28 | 13.7 | 1.32 | 0.9 | 30 [ppm Hf] | 0.6 | 500 [ppm] | 1.1 | 59 [ppm Al] | 46 |
| EPDM01-R1 | 0.25 | 15.8 | 0.49 | 5.8 | 36,500 | 14.6 | 20,800 | 47 | 16,000 | 12,220 |
| EPDM01 | 1.15 | 11.3 | 0.71 | 5.7 | 36,500 | 14.6 | 20,800 | 47 | 16,000 | 18,480 |
| EPDM02-R1 | 0.34 | 19.68 | 0.27 | 1.06 | 99.98 | 1.23 | 1099.58 | 0.92 | 498.03 | 20.09 |
| EPDM02 | 1.61 | 12.61 | 0.35 | 0.56 | 99.98 | 0.67 | 1099.58 | 0.50 | 498.03 | 19.41 |
| EPDM03-R1 | 0.47 | 19.68 | 0.21 | 1.09 | 99.98 | 1.32 | 1078.69 | 0.99 | 480.74 | 22.86 |
| EPDM03 | 0.69 | 12.40 | 0.39 | 0.62 | 99.98 | 0.75 | 1099.58 | 0.63 | 498.03 | 23.86 |

TABLE 4

Polymer Properties (EPDM, Continuous Polymerization)

| Ex. | Cat. | Mw (g/mol) | Mw/Mn | Mooney Viscosity | Viscosity (pa-s) at 0.1 rad/s | Rheology Ratio V0.1/V100 | Polymer C2 wt %* | Polymer ENB wt %* | Polymer ENB wt %** | NMR % Peak Area 21.3 to 21.8 ppm |
|---|---|---|---|---|---|---|---|---|---|---|
| B | CAT-01 | 221,870 | 2.3 | 134 | 171632 | 30.3 | 70.3 | 4.7 | | 2.0 |
| 2 | CAT-37 | 160,881 | 2.3 | 80 | 190000 | 48.5 | 70.6 | 7.6 | | 5.0-8.0 |
| EPDM01-R1 | CAT-37 | 144310 | 2.2 | 40.5 | 145560 | 65.5 | 70.1 | | 5.1 | 5.0-8.0 |
| EPDM01 | CAT-37 | 99290 | 2.69 | 21.5 | 58749 | 37.7 | 71.0 | | 5.0 | 5.0-8.0 |
| EPDM02 | CAT-37 | 205209 | 2.13 | 76.0 | 108410 | 29.4 | 50.2 | | 5.1 | 18.2 |
| EPDM03 | CAT-37 | 201410 | 2.11 | 73.9 | 99042 | 26.2 | 49.1 | | 4.8 | 18.8 |

*Measured by FTIR
**Measured by 13C NMR

As discussed above, FIG. 1 shows that inventive interpolymers, similar to example 2, show a higher percent area in the region from 19.5 ppm to 22.0 ppm (7% for two peaks at 21.4 ppm and 21.6 ppm), compared comparative example B* (2% percent area in the region from 19.5 ppm to 22.0 ppm). For other polymers such as polypropylene-based homopolymers and copolymers, these two distinct peaks present at 21.6 and 21.4 ppm are typically related to differences in tacticity of the propylene sequences that have been incorporated into the polymer. Table 4 shows the % NMR Peak Area from 21.3 to 21.8 ppm for the examples and as shown, the inventive examples all exhibit % NMR Peak Areas greater than 3.5%, and greater than the comparative example B (2.0 wt %). For the examples containing 70 wt % C2 in the polymer, the % NMR Peak Area is from 5.0 to 8.0 percent, while the examples containing 50 wt % C2 in the polymer, the NMR Peak Area is about 18 percent.

It has been discovered that Inventive examples have a very high rheology ratio when compared to those interpolymers produced in the batch processes, discussed above, at high temperature (greater than 150° C.). It has been discovered that CAT-37, when used in a continuous process, results in a polymer with significantly high rheology ratio (indicative of high long chain branching), while maintaining high catalyst activity during the polymerization.

The invention claimed is:

1. A solution polymerization process to form an ethylene/α-olefin/nonconjugated polyene interpolymer, said process comprising polymerizing ethylene, an α-olefin, and a non-conjugated polyene in at least one reactor in the presence of a metal-ligand complex selected from Formula I:

(I)

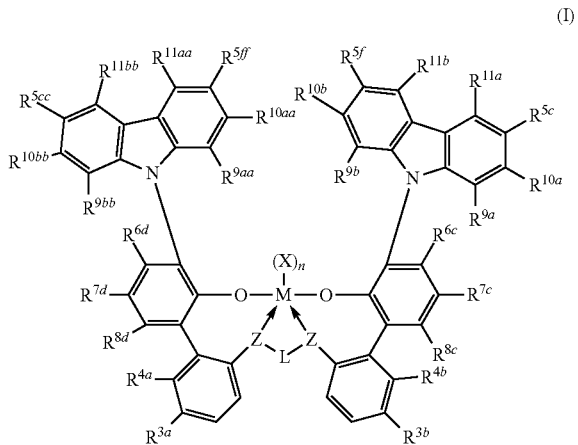

wherein:
M is a metal of any one of Groups 3 to 6 of the Periodic Table of the Elements (e.g., Group 4), the metal M being in a formal oxidation state of +2, +3, +4, +5, or +6; n is an integer of from 0 to 5, wherein when n is 0, X is absent (i.e., (X)n is absent);

each X, independently, is a monodentate ligand that is neutral, monoanionic, dianionic, trianionic, or tetraionic; or two X are taken together to form a bidentate ligand that is neutral, monoanionic, or dianionic; X and n are chosen in such a way that the metal-ligand complex of formula (I) is, overall, neutral;

each Z, independently, is O, S, N(C1-C40)hydrocarbyl, or P(C1-C40)hydrocarbyl;

L is (C1-C40)hydrocarbylene or (C1-C40)heterohydrocarbylene, wherein the (C1-C40)hydrocarbylene has a portion that comprises a 1-carbon atom to 18-carbon atom linker backbone, linking the Z atoms in formula (I) (to which Z atoms L is bonded) and the (C1-C40)heterohydrocarbylene has a portion that comprises a 1-atom to 18-atom linker backbone, linking the Z atoms in formula (I), wherein each of the from 1 to 18 atoms of the 1-atom to 18-atom linker backbone of the (C1-C40)heterohydrocarbylene independently is a carbon atom or heteroatom, wherein each heteroatom independently is O, S, S(O), S(O)$_2$, Si($^R$C)$_2$, P($^R$P), or N($^R$N), wherein independently each $^R$C independently is substituted or unsubstituted (C1-C18)hydrocarbyl; (C1-C18)heterohydrocarbyl; each $^R$P independently is substituted or unsubstituted (C1-C18)hydrocarbyl; (C1-C18)heterohydrocarbyl; and each $^R$N independently is substituted or unsubstituted (C1-C18)hydrocarbyl; (C1-C18)heterohydrocarbyl or absent (e.g., when the N to which $^R$N is bonded as —N=);

each of R$^{3a}$, R$^{4a}$, R$^{3b}$ and R$^{4b}$, independently, is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$ or halogen atom; wherein $^R$C, $^R$N and $^R$P are defined above;

at least one of R$^{6c}$, R$^{7c}$, and R$^{8c}$, and at least one of R$^{6d}$, R$^{7d}$, and R$^{8d}$, independently, are (C2-C40)hydrocarbyl; Si(Rc)$_3$, and each of the others of R$^{6c}$, R$^{7c}$, R$^{8c}$, R$^{6d}$, R$^{7d}$, and R$^{8d}$, independently, is a hydrogen atom; (C1-C40) hydrocarbyl; (C1-C40)heterohydrocarbyl; Si($^R$C)$_3$;

O($^R$C); S($^R$C); N($^R$N)$_2$; P($^R$P)$_2$; or halogen atom; wherein $^R$C, $^R$N and $^R$P are defined above; and;

optionally two or more R groups (from R$^{3a}$ to R$^{8d}$) can combine together into one or more ring structures, with such ring structures having from 3 to 50 atoms in the ring not counting hydrogen atoms;

at least one of R$^{5c}$ and R$^{5f}$, independently, is a (C1-C40) hydrocarbyl; (C1-C40)heterohydrocarbyl; Si($^R$C)$_3$; O($^R$C); S($^R$C); N($^R$N)$_2$; P($^R$P)$_2$; or halogen atom; and the other of R$^{5c}$ and R$^{5f}$, independently, is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$ or halogen atom; wherein $^R$C, $^R$N and $^R$P are defined above;

at least one of R$^{5cc}$ and R$^{5ff}$ independently is a (C1-C40) hydrocarbyl; (C1-C40)heterohydrocarbyl; Si($^R$C)$_3$; O($^R$C); S($^R$C); N($^R$N)$_2$; P($^R$P)$_2$ or halogen atom; and the other of R$^{5cc}$ and R$^{5ff}$ independently is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$; or halogen atom; wherein $^R$C, $^R$N and $^R$P are defined above;

each of R$^{9a}$, R$^{10a}$, R$^{11a}$, R$^{9b}$, R$^{10b}$, R$^{11b}$, R$^{9aa}$, R$^{10aa}$, R$^{11aa}$, R$^{9bb}$, R$^{10bb}$ and R$^{11bb}$, independently, is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$; or halogen atom; wherein $^R$C, $^R$N and $^R$P are defined above; and optionally two or more carbazole R groups (e.g. R$^{9a}$, R$^{10a}$, R$^{5a}$, R$^{11a}$, R$^{9b}$, R$^{10b}$, R$^{5f}$, R$^{11b}$) can combine together into one or more ring structures, with such ring structures having from 3 to 50 atoms in the ring not counting hydrogen atoms;

each of the aforementioned hydrocarbyl (e.g., $^R$C, $^R$N, $^R$P, (C1-C40)hydrocarbyl), heterohydrocarbyl (e.g., (C1-C40)heterohydrocarbyl), hydrocarbylene (e.g., (C1-C40) hydrocarbylene), and heterohydrocarbylene (e.g., (C1-C40)heterohydrocarbylene) groups, independently, is unsubstituted or substituted with at least one substituent R$^S$ (up to and including persubstitution by R$^S$);

the sum of carbon atoms in R$^{5c}$+R$^{5f}$+R$^{7c}$ is greater than 5 carbon atoms or the sum of carbon atoms in R$^{5cc}$+R$^{5ff}$+R$^{7d}$ is greater than 5 carbon atoms; and each R$^S$, independently, is a halogen atom, polyfluoro substitution (that is one of the at least one substituent R$^S$ stands for at least two fluoro substituents, which formally replace at least two hydrogen atoms of an unsubstituted version of the substituted group), perfluoro substitution (that is the one R$^S$ stands for as many fluoro substituents as hydrogen atoms of an unsubstituted version of the substituted group that is substituted thereby), unsubstituted (C1-C18)alkyl, F$_3$C—, FCH$_2$O—, F$_2$HCO—, F$_3$CO—, R$_3$Si—, RO—, RS—, RS(O)—, RS(O)$_2$—, R$_2$P—, R$_2$N—, R2C=N—, NC—, RC(O)O—, ROC(O)—, RC(O)N(R)—, or R$_2$NC(O)—, or two of the R$^S$ are taken together to form an unsubstituted (C1-C18)alkylene, wherein each R independently is an unsubstituted (C1-C18)alkyl; and wherein the polymerization is conducted in a continuous process; and wherein interpolymer has a rheology ratio (V0.1/V100 at 190° C.) greater than, or equal to, 20.

2. The process of claim 1, wherein each Z is O.

3. The process of claim 2, wherein the metal-ligand complex of formula (I) is a metal-ligand complex of formula (Ia):

(Ia)

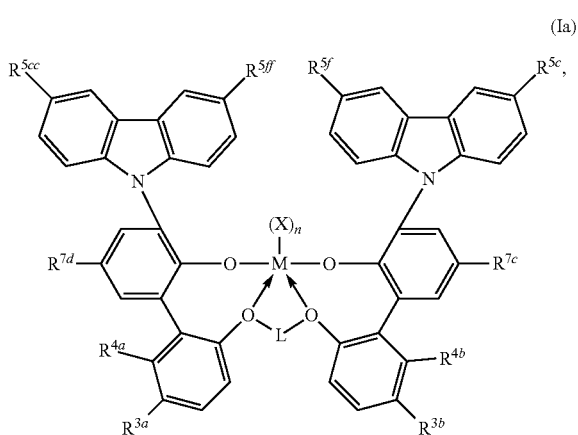

and wherein $R^{7c}$ and $R^{7d}$ are each independently a (C$_4$-C$_{40}$) hydrocarbyl; and wherein M is a metal of any one of Groups 3 to 6 of the Periodic Table of the Elements (e.g., Group 4), the metal M being in a formal oxidation state of +2, +3, +4, +5, or +6; n is an integer of from 0 to 5, wherein when n is 0, X is absent (i.e., (X)n is absent);

each X, independently, is a monodentate ligand that is neutral, monoanionic, dianionic, trianionic, or tetraionic; or two X are taken together to form a bidentate ligand that is neutral, monoanionic, or dianionic; X and n are chosen in such a way that the metal-ligand complex of formula (I) is, overall, neutral;

L is (C1-C40)hydrocarbylene or (C1-C40)heterohydrocarbylene, wherein the (C1-C40)hydrocarbylene has a portion that comprises a 1-carbon atom to 18-carbon atom linker backbone, linking the Z atoms in formula (I) (to which Z atoms L is bonded) and the (C1-C40)heterohydrocarbylene has a portion that comprises a 1-atom to 18-atom linker backbone, linking the Z atoms in formula (I), wherein each of the from 1 to 18 atoms of the 1-atom to 18-atom linker backbone of the (C1-C40)heterohydrocarbylene independently is a carbon atom or heteroatom, wherein each heteroatom independently is O, S, S(O), S(O)$_2$, Si($^R$C)$_2$, P($^R$P), or N($^R$N), wherein independently each $^R$C independently is substituted or unsubstituted (C1-C18)hydrocarbyl; (C1-C18)heterohydrocarbyl; each $^R$P independently is substituted or unsubstituted (C1-C18)hydrocarbyl; (C1-C18)heterohydrocarbyl; and each $^R$N independently is substituted or unsubstituted (C1-C18)hydrocarbyl; (C1-C18)heterohydrocarbyl or absent (e.g., when the N to which $^R$N is bonded as —N═);

each of $R^{3a}$, $R^{4a}$, $R^{3b}$ and $R^{4b}$, independently, is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$ or halogen atom; wherein $^R$C, $^R$N and $^R$P are defined above;

at least one of $R^{5c}$ and $R^{5f}$, independently, is a (C1-C40) hydrocarbyl; (C1-C40)heterohydrocarbyl; Si($^R$C)$_3$; O($^R$C); S($^R$C); N($^R$N)$_2$; P($^R$P)$_2$; or halogen atom; and the other of $R^{5c}$ and $R^{5f}$, independently, is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$ or halogen atom; wherein $^R$C, $^R$N and $^R$P are defined above;

at least one of $R^{5cc}$ and $R^{5ff}$ independently is a (C1-C40) hydrocarbyl; (C1-C40)heterohydrocarbyl; Si($^R$C)$_3$; O($^R$C); S($^R$C); N($^R$N)$_2$; P($^R$P)$_2$ or halogen atom; and the other of $R^{5cc}$ and $R^{5ff}$ independently is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$; or halogen atom; wherein $^R$C, $^R$N and $^R$P are defined above;

each of the aforementioned hydrocarbyl (e.g., $^R$C, $^R$N, $^R$P, (C1-C40)hydrocarbyl), heterohydrocarbyl (e.g., (C1-C40)heterohydrocarbyl), hydrocarbylene (e.g., (C1-C40) hydrocarbylene), and heterohydrocarbylene (e.g., (C1-C40)heterohydrocarbylene) groups, independently, is unsubstituted or substituted with at least one substituent $R^S$ (up to and including persubstitution by $R^S$);

the sum of carbon atoms in $R^{5c}+R^{5f}+R^{7c}$ is greater than 5 carbon atoms or the sum of carbon atoms in $R^{5cc}+R^{5ff}+R^{7d}$ is greater than 5 carbon atoms; and each $R^S$, independently, is a halogen atom, polyfluoro substitution (that is one of the at least one substituent $R^S$ stands for at least two fluoro substituents, which formally replace at least two hydrogen atoms of an unsubstituted version of the substituted group), perfluoro substitution (that is the one $R^S$ stands for as many fluoro substituents as hydrogen atoms of an unsubstituted version of the substituted group that is substituted thereby), unsubstituted (C1-C18)alkyl, F$_3$C—, FCH$_2$O—, F$_2$HCO—, F$_3$CO—, R$_3$Si—, RO—, RS—, RS(O)—, RS(O)$_2$—, R$_2$P—, R$_2$N—, R2C═N—, NC—, RC(O)O—, ROC(O)—, RC(O)N(R)—, or R$_2$NC(O)—, or two of the $R^S$ are taken together to form an unsubstituted (C1-C18)alkylene, wherein each R independently is an unsubstituted (C1-C18)alkyl.

4. The process of claim 3, wherein the metal-ligand complex of formula (I) is a metal-ligand complex of formula (Ia-1):

(Ia-1)

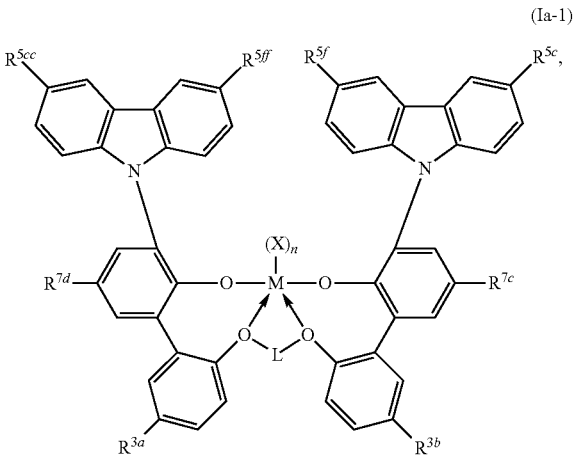

and wherein $R^{7c}$ and $R^{7d}$ are each independently a (C$_4$-C$_{40}$) hydrocarbyl; and wherein M is a metal of any one of Groups 3 to 6 of the Periodic Table of the Elements (e.g., Group 4), the metal M being in a formal oxidation state of +2, +3, +4, +5, or +6; n is an integer of from 0 to 5, wherein when n is 0, X is absent (i.e., (X)n is absent);

each X, independently, is a monodentate ligand that is neutral, monoanionic, dianionic, trianionic, or tetraionic; or two X are taken together to form a bidentate ligand that is neutral, monoanionic, or dianionic; X and n are chosen in such a way that the metal-ligand complex of formula (I) is, overall, neutral;

L is (C1-C40)hydrocarbylene or (C1-C40)heterohydrocarbylene, wherein the (C1-C40)hydrocarbylene has a portion that comprises a 1-carbon atom to 18-carbon atom linker backbone, linking the Z atoms in formula (I) (to which Z atoms L is bonded) and the (C1-C40)heterohydrocarbylene has a portion that comprises a 1-atom to 18-atom linker backbone, linking the Z atoms in formula (I), wherein each of the from 1 to 18 atoms of the 1-atom to 18-atom linker backbone of the (C1-C40)heterohydrocarbylene independently is a carbon atom or heteroatom, wherein each heteroatom independently is O, S, S(O), S(O)$_2$, Si($^R$C)$_2$, P($^R$P), or N($^R$N), wherein independently each $^R$C independently is substituted or unsubstituted (C1-C18)hydrocarbyl; (C1-C18)heterohydrocarbyl; each $^R$P independently is substituted or unsubstituted (C1-C18)hydrocarbyl; (C1-C18)heterohydrocarbyl; and each $^R$N independently is substituted or unsubstituted (C1-C18)hydrocarbyl; (C1-C18)heterohydrocarbyl or absent (e.g., when the N to which $^R$N is bonded as —N=);

each of $R^{3a}$ and $R^{3b}$, independently, is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$ or halogen atom; wherein $^R$C, $^R$N and $^R$P are defined above;

at least one of $R^{5c}$ and $R^{5f}$, independently, is a (C1-C40) hydrocarbyl; (C1-C40)heterohydrocarbyl; Si($^R$C)$_3$; O($^R$C); S($^R$C); N($^R$N)$_2$; P($^R$P)$_2$; or halogen atom; and the other of $R^{5c}$ and $R^{5f}$, independently, is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$ or halogen atom; wherein $^R$C, $^R$N and $^R$P are defined above;

at least one of $R^{5cc}$ and $R^{5ff}$ independently is a (C1-C40) hydrocarbyl; (C1-C40)heterohydrocarbyl; Si($^R$C)$_3$; O($^R$C); S($^R$C); N($^R$N)$_2$; P($^R$P)$_2$ or halogen atom; and the other of $R^{5cc}$ and $R^{5ff}$ independently is a hydrogen atom; (C1-C40)hydrocarbyl; (C1-C40)heterohydrocarbyl; Si($^R$C)$_3$; O($^R$C); S($^R$C); N($^R$N)$_2$; P($^R$P)$_2$; or halogen atom; wherein $^R$C, $^R$N and $^R$P are defined above;

each of the aforementioned hydrocarbyl (e.g., $^R$C, $^R$N, $^R$P, (C1-C40)hydrocarbyl), heterohydrocarbyl (e.g., (C1-C40)heterohydrocarbyl), hydrocarbylene (e.g., (C1-C40) hydrocarbylene), and heterohydrocarbylene (e.g., (C1-C40)heterohydrocarbylene) groups, independently, is unsubstituted or substituted with at least one substituent $R^S$ (up to and including persubstitution by $R^S$);

the sum of carbon atoms in $R^{5c}+R^{5f}+R^{7c}$ is greater than 5 carbon atoms or the sum of carbon atoms in $R^{5cc}+PR^{5ff}+R^{7d}$ is greater than 5 carbon atoms; and each $R^S$, independently, is a halogen atom, polyfluoro substitution (that is one of the at least one substituent $R^S$ stands for at least two fluoro substituents, which formally replace at least two hydrogen atoms of an unsubstituted version of the substituted group), perfluoro substitution (that is the one $R^S$ stands for as many fluoro substituents as hydrogen atoms of an unsubstituted version of the substituted group that is substituted thereby), unsubstituted (C1-C18)alkyl, F$_3$C—, FCH$_2$O—, F$_2$HCO—, F$_3$CO—, R$_3$Si—, RO—, RS—, RS(O)—, RS(O)$_2$—, R$_2$P—, R$_2$N—, R2C=N—, NC—, RC(O)O—, ROC(O)—, RC(O)N(R)—, or R$_2$NC(O)—, or two of the $R^S$ are taken together to form an unsubstituted (C1-C18)alkylene, wherein each R independently is an unsubstituted (C1-C18)alkyl.

5. The process of claim 1, wherein each of $R^{5c}$, $R^{5f}$, $R^{5cc}$, and $R^{5ff}$ independently is (C$_1$-C$_{40}$)hydrocarbyl.

6. The process of claim 1, wherein each of $R^{7c}$ and $R^{7d}$ independently is (C$_4$-C$_{10}$)hydrocarbyl.

7. The process of claim 1, wherein each of $R^{3a}$ and $R^{3b}$, independently, is (C$_1$-C$_6$)alkyl, (C$_1$-C$_6$)alkyl-O—, ((C$_1$-C$_6$)alkyl)$_2$-N—, (C$_3$-C$_6$)cycloalkyl, fluorine atom, or chlorine atom.

8. The process of claim 1, wherein L is the (C$_1$-C$_{40}$)hydrocarbylene that has a portion that comprises a 1-carbon atom to 6-carbon atom linker backbone linking the Z atoms in formula (I).

9. The process of claim 1, wherein the polymer concentration in reactor is greater than 5 wt %, based on the total feed to reactor.

10. The process of claim 1, wherein the polymerization takes place in two reactors in series.

11. The process of claim 10, wherein the first reactor temperature is from 90° C. to 160° C., and the second reactor temperature is from 150° C. to 200° C.

* * * * *